July 9, 1968     E. J. D'ONOFRIO ET AL     3,391,421
APPARATUS FOR BIAXIAL STRETCHING OF A POLYMERIC SHEET Filed June 6, 1966     2 Sheets-Sheet 1

EDMOND J. D'ONOFRIO
ROBERT A. JACKSON
INVENTORS

BY

ATTORNEY

United States Patent Office 3,391,421
Patented July 9, 1968

3,391,421
APPARATUS FOR BIAXIAL STRETCHING OF A POLYMERIC SHEET
Edmond J. D'Onofrio and Robert A. Jackson, Rochester, N.Y., assignors to Eastman Kodak Company, Rochester, N.Y., a corporation of New Jersey
Filed June 6, 1966, Ser. No. 555,360
5 Claims. (Cl. 18—1)

ABSTRACT OF THE DISCLOSURE

Improved, more uniformly properties of biaxially oriented plastic films can be obtained by using, in an apparatus for simultaneously biaxially orienting the film special grippers (a) that are not positively driven through the transverse stretching station of the apparatus, (b) that have only rolling means in contact with the guide track, (c) that have two parallel sides in order to permit adjacent contact with the next gripper on either side thereof at the gripping station (where the grippers initially grasp the film), and (d) that have a recessed shoulder between the sides and the point at which the gripper actually grasps the film (in order to provide a portion of ungripped edge of the film in spite of the actual contact of the parallel sides of adjacent grippers).

---

The present invention relates to the manufacture of plastic films or sheets, and particularly to an apparatus for biaxially stretching polymeric materials such as polyethylene terephthalate and the like, in two mutually perpendicular directions to improve the properties of the material.

Polymeric films are generally manufactured by forcing the melted polymer through a derisable shaped die such as an annular or elongated slot, and then cooling the continuously extruded material. At this stage the film is reasonably strong but is without marked molecular orientation, has inferior tensile qualities and tends to assume opaque or hazy optical characteristics.

It has been recognized, however, that the physical properties of the film can be vastly improved by stretching or drawing the film in both the longitudinal direction (drafting) and transverse direction (tentering). The stretching is normally conducted at an elevated temperature in the range of the sheet softening point of the film. During stretching the essentially unoriented film acquires a condition of plane molecular orientation. This rearrangement in structure is accompanied by the development of greatly enhanced tensile strength. Furthermore, to obtain uniform molecular orientation in all directions and to simplify the stretching operation it has been known heretofore to stretch the film simultaneously in both the longitudinal and the transverse directions.

Apparatus for simultaneously stretching a continuous web of polymeric film in two mutually perpendicular directions have been of at least two types. In both types drafting is obtained by employing differential speed rollers. The two types differ, however, in the means provided for tentering the web of film.

In the first type a continuous bead is formed on both longitudinal edges of the film. The beaded edges are then placed into stationary metal tracks or rollers disposed in planes which diverge from the longitudinal centerline of the continually moving film. This known type of apparatus has several disadvantages. Friction arising from the beaded edges of the film sliding over the stationary tracks or rollers introduces a number of problems relating to both the actual stretching operation and the properties which are imparted to the film. The manner in which frictional energy dissipate occurs along the stretching area is such that the frictional effects are brought into play in a somewhat complex manner, thus precluding the use of such known streaching apparatus in high speed commercial film stretching operations.

The second type of tentering apparatus was developed to overcome these disadvantages of the beaded edge tentering apparatus. According to this second type of apparatus opposite longitudinal edges of the film are grasped by a plurality of clips or grippers. The grippers are then advanced longitudinally of the film along paths which diverge from the longitudinal centerline of the film thereby tentering the film. The present invention relates to an improved film stretching apparatus of the type using grippers to effect tentering of the film.

Heretofore gripper type tentering apparatus has had several disadvantages. Unlike the beaded edge type tentering apparatus, in the gripper type apparatus the film is grasped only at a finite number of points along its longitudinal edges (rather than continuously as in the beaded edge apparatus). As the grippers proceed along the diverging paths they will exert a positive lateral pull on the film only where they actually grasp the film. The portions of the film edges between the grippers will, of course, be pulled laterally to some extent. However, they will not be pulled quite as far as the gripped portion of the edges. As a result, the edges of the stretched film will be scalloped. The scalloped edge portion must be trimmed and discarded since the finished sheet of film must have smooth edges. Therefore, minimum edge loss (due to trimming of the scalloped edges) is obtained when the individual scallops are as small as possible.

To obtain small scallops it would be logical to place the grippers immediately adjacent each other thereby eliminating the space between adjacent grippers. However this arragement would be impossible in a simultaneous drafing and tentering operation since a sufficient portion of the film edge must be left free to be stretched in the longitudinal direction. Otherwise, the drafting of the film would be most unsatisfactory. The film would be drafted extensively along the center line of the web, but only negligibly at the edges. For example, a hypothetical transverse strip of the film having a uniform width in the unstretched state would become a bell-shaped strip after the stretching operation.

It can be seen, therefore, that in arranging the grippers, a balance must be established between placing the grippers as close as possible to get minimum scalloping and spacing the grippers apart a sufficient amount to allow the edges of the web to be drafted along with the central portion of the web.

In previous devices the need for establishing a proper balance of the gripper spacing either (1) has not been considered or (2) has been recognized but corrected only by employing highly complex and inflexible gripper driving means for positively driving the grippers along the diverging paths to provide proper initial spacing between successive grippers and proper spacing as the grippers advance along the diverging paths. In such a driving means, not only must each gripper be structurally dependent upon every other gripper, but the increasing distance between the grippers must be precisely in time with the differential speed drafting rollers.

The purpose of the present invention is to provide an edge gripper type tentering apparatus for use in a simultaneous biaxial stretching operation which apparatus allows proper spacing to be obtained between grippers but which is vastly simplified compared with previously known edge gripper tentering devices.

Briefly summarizing, according to the present invention there is provided a simultaneous biaxial film stretching station in which positive gripper driving means are eliminated. Rather, the grippers are simply placed independently of each other and independently of any positive driving means on a pair of diverging tracks. The grippers are made to positively grasp the edge of the film at the position whereat the film is unstretched. As the film is then stretched longitudinally, the film itself actually pulls the grippers longitudinally along the diverging paths, as a result of which the film is tentered.

The concept of providing independent individual grippers will not in itself assure proper spacing between the adjacent grippers either initially or when the grippers move along the diverging paths. Rather than employ a complex apparatus to establish the correct initial distance between the grippers, however, according to the present invention there is provided a novel gripper device which may simply be shoved up against the next gripper at the position where it initially grasps the film, and still provide a sufficient amount of free film edge for longitudinal stretching. Each gripper device has a narrow film grasping surface the two side edges of which are spaced inwardly from the sides of the gripper device itself to form a recessed shoulder between the edges of each side the film grasping surface and the sides of the gripper device itself. The film edge in this recessed shoulder portion is then left free to be stretched longitudinally. For convenience, the film grasping surface will be referred to hereinafter as the contact surface.

Other factors must also be considered in order to provide an improved gripping device. The individual grippers should be as narrow as possible (taken in the direction of movement of the web). However if they are too narrow, it will be most difficult to provide proper rolling means to eliminate friction between the gripper device and the track on which the grippers ride. However, in the independently mounted type gripper, since it is contemplated that the grippers will be propelled solely by the movement of the film web, it is imperative that the friction between the grippers and the track be reduced to an absolute minimum. Therefore, according to one feature of the present invention, there is provided a gripper which is extremely compact (narrow) but which has an extremely effective roller arrangement for reducing friction between the grippers and the track.

The advantages of the present invention are manifest. By providing compact, narrow, independently mounted grippers having recessed shoulders there is provided an extremely simplified device which accomplishes results heretofore obtainable only by very complicated apparatus. Scalloping may be minimized by using a large number of narrow grippers while a sufficient amount of the film edge is left free. Further, friction between the grippers and the tracks is substantially minimized.

Accordingly, it is an object of this invention to provide a biaxial film stretching apparatus employing an edge gripper type tentering device which is greatly simplified in comparison with the previously known devices, and wherein the grippers are independently, individually, and substantially frictionlessly mounted on the diverging tracks.

It is another object of this invention to provide a gripper type tendering device to be used in a biaxial film stretching apparatus, in which the grippers allow substantial minimization of scalloping of the film edges although the grippers are extremely simple in their operation and are in substantially frictionless contact with the tracks on which they ride.

These and other objects, features and advantages of the present invention will become more apparent from the following detailed description of the invention together with the accompanying drawings in which.

Generally, the apparatus of the present invention includes a gripper device having two main portions, a track portion and a film holding portion. The track portion is designed to ride on one of the diverging tracks of the stretching station so that friction between the track portion and the track is reduced to an absolute minimum. The film holding portion includes a lever which is spring-biased to hold the film to a contact surface. The lever is constructed to be spring-biased in the closed or film holding position and to be moved away from the contact surface by a cam means which acts against the force of the spring. Between the edges of the contact surface and the sides of the gripping device are recessed shoulder portions. Because of the recessed shoulders the grippers may simply be shoved into place immediately adjacent each other when they initially grasp the film at the entrance end of the stretching station and still leave a sufficient amount of free film edge to allow longitudinal stretching of the edge of the film.

The apparatus of the invention also includes a simplified stretching station. The essential elements of the stretching station, aside from the longitudinal web feeding and stretching apparatus includes the diverging tracks, the grippers mounted on the tracks, and cam means mounted at the entrance and exit ends of the stretching station to move the spring-biased levers to the non-gripping position to grip and release the film respectively.

Figure 1:
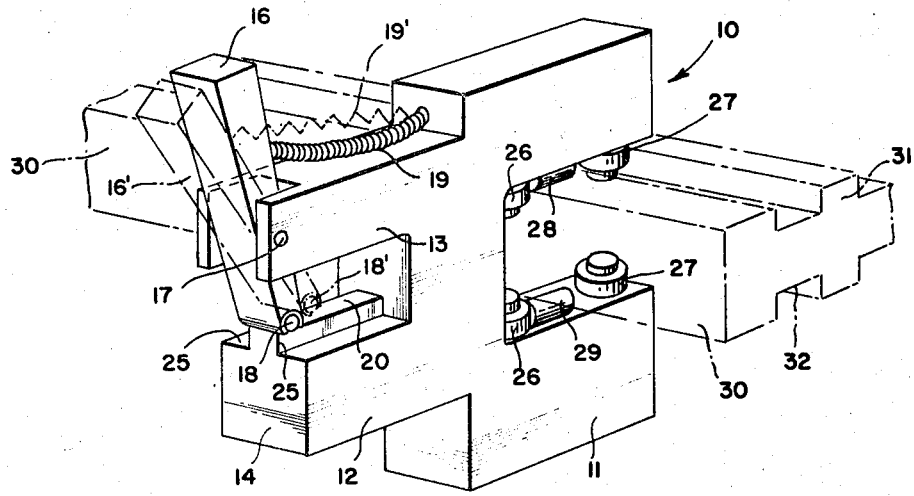
FIG. 1 is a perspective view of a gripper device according to the present invention showing also how the gripper is mounted on the track.

Referring now to FIG. 1 there is shown a gripper device according to the present invention. The gripper 10 includes a track portion 11 and a film holding portion 12. The film holding portion includes an upper extension 13 and a lower extension 14. The upper extension 13 has a vertical recess at the outer end thereof which recess receives a lever 16 pivotally mounted about a pivot 17 which traverses the recess thereby pivotally engaging the lever 16 to the upper extension 13. The lever 16 has a rod 18 positioned at its lower end, the rod 18 being of a frictional material such as a file for holding the film therebetween. The lever 16 is so mounted that the lever leans outwardly away from the gripper device when the rod 18 contacts the surface 20. A tension spring 19 is connected to the upper portion of the lever 16 above the pin 17 urging the rod 18 into contact with the surface 20 to hold film which is positioned therebetween. The lever 16 is thereby adapted to break its contact with surface 20 when an outward force is applied to the upper portion of the lever against the force of spring 19. The lever 16 is shown in its disengaged position at 16' in FIG. 1. In this position the rod and spring will move to the positions shown at 18' and 19'. In the absence of such a force the spring 19 will urge the rod 18 against the surface 20 to hold the film in position therebetween. Immediately adjacent the lateral edges of surface 20 are two recessed shoulders 25. Because of these shoulders the film is actually grasped only along the portion of rod 18 which is in contact with raised contact surface 20. Because of the recesses the gripper devices may simply be shoved together side-by-side along the longitudinal edge of the film at the beginning of the stretching station without taking special effort to provide sufficient clearance between adjacent grippers which would otherwise be necessary to assure proper longitudinal stretching at the edge of the film.

The track portion 11 is mounted on a track, such as track 30 shown in phantom lines in FIG. 1, in such a manner that the gripper device will be firmly supported on the track and the friction between the gripper device and the track will be held to an absolute minimum. In the embodiment of FIG. 1 there is shown a pair of inner bearing rollers 26 which counteract the forces tending to urge the gripper towards the track, outer bearing rollers 27 which contact the opposite side of the track to counteract the forces tending to pull the gripper towards the film, and finally, upper and lower bearing rollers 28 and 29 which contact the top and bottom surface of the track respectively preventing rotational movement of the grippers about an axis lying approximately in the plane of the film material and running in the transverse direction. The particular arrangement of the rollers in the track portion 11 are chosen to provide maximum reduction of friction in a minimum width. For example, rollers 26–29 (1) assure that all contact between the grippers and the track is rolling (rather than sliding) contact, (2) counter all turning movements acting upon gripper 10, and (3) perform these functions in a space not much wider than the diameter of one roller, for example roller 27.

Figure 2:
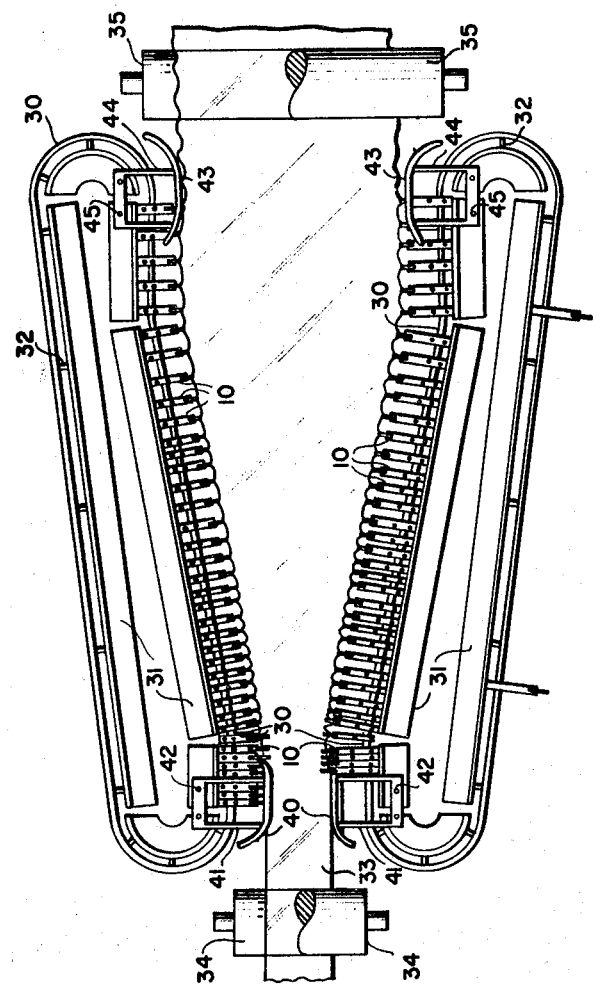
FIG. 2 is a schematic drawing showing a stretching station for biaxially stretching a web of film material and employing a plurality of grippers of the type shown in FIG. 1.

FIG. 2 shows schematically a plan view of the overall stretching station. The film 33 passes from an entrance roller 34 to an exit roller 35 between a symmetrical pair of continuous tracks which diverge in a portion of the stretching area between the rollers. The stretching station is divided into three main areas, a pre-heat section, a stretch section, and a cooling section. In the pre-heat section the unoriented film is brought up to the stretching temperature. Immediately following the pre-heat section the film enters the stretch sections where the tracks diverge from the centerline of the web. Finally, at a point where the tracks stop diverging and continue again along parallel paths, there is the cooling section at which the film is cooled down from the stretching temperature.

The film 33 enters the stretching station between rollers 34 and leaves between rollers 35. The surface speed of the rollers 35 is greater than that of the rollers 34 so that longitudinal stretching occurs in the film. A pair of continuous tracks 30 are mounted on either side of the film in the stretching section. The tracks are attached by means of rods 32 to track support frames 31. The tracks are parallel in the pre-heat section, diverging in the stretching section, and again parallel in the cooling section. A plurality of grippers 10 mounted on the tracks 30 are arranged to grip the edge of the film at the pre-heat section and release the film at the cooling section after which the grippers are moved to the back of the tracks 30 where they continue around the continuous tracks 30 to return to the pre-heat section. Any conventional means may be provided for returning the grippers 10 from the cooling section around the back of the tracks 30 to the pre-heat section. Such apparatus is not shown in the drawings since it forms no part of the present invention.

Cam means 40 and 43 are provided at the pre-heat and cooling sections respectively. As the grippers 10 approach the pre-heat section the cam 40 engages the upper portion of the lever 16 urging the same outwardly and thereby urging the rod 18 away from contact surface 20. Thus, as the grippers 10 enter the pre-heat section they are maintained in non-gripping position. Within the pre-heat section the surface 20 is moved below the film so that the film will be held by rod 18 and surface 20 as soon as the lever 16 is released. A short distance prior to the point at which the tracks start to diverge, the cam rod 40 ends thereby allowing the spring 19 to urge the rod 18 into engagement with the film on surface 20. At the cooling section, after the tracks have again assumed parallel paths, the cam 43 engages the upper portion of lever 16 in precisely the manner as did cam 40, to disengage the lever from the film.

The cam rods 40 are attached to the frame 31 by arms 41 and connecting means 42. Similarly, the cam rod 43 is connected to the frames 31 by means of arms 44 and connecting means such as screws 45.

FIG. 2 shows a full row of grippers 10 on each of the diverging tracks 30. It can be seen that the grippers 10 on either track are positioned immediately adjacent each other as they initially grip the film 33 just after the levers 16 are released by the cam rods 40. As the film then progresses through the stretching section the space between adjacent grippers is gradually increased by the longitudinal stretching of the film and the geometry of the diverging tracks. It can be seen that the grippers 10 have no propelling force other than their attachment to the film 33 and the driving force of the film 33 by rollers 34 and 35.

In any edge gripper biaxial stretching apparatus scallops will occur on the edge of the film between the surfaces at which the film is actually grasped. Such scallops are visible between the grippers in FIG. 2. However, it will be noted that each scallop is very small. This minimization of the size of each scallop is provided, first, because a large number of grippers are used and second, because they are close together. In the present invention, because of the recessed shoulders 25 adjacent each edge of the surface 20, this minimization of scalloping is provided without taking special pains to adjust the distance between the adjacent grippers to assure longitudinal stretching of the film at the edges thereof. Thus, in a single device there is provided an extremely simplified gripper device and minimization of edge loss.

Figure 3:
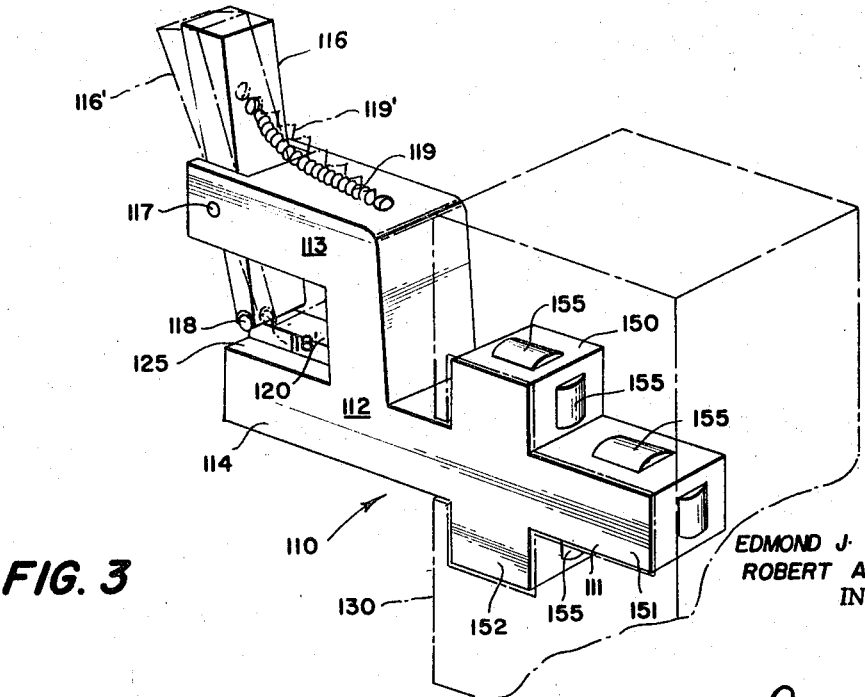
FIG. 3 is a perspective view of a modified gripper and shows the gripper mounted on a track.

FIG. 3 shows a gripping device 110 which is a modification of the gripper device shown in FIG. 1. There is a track portion 111 and a film holding portion 112. The film holding portion 112 is identical to the portion 12 in the embodiment of FIG. 1. Accordingly, the numerals employed to indicate the elements of the portion 112 are in the one hundred series but otherwise are the same as the numerals employed to indicate the elements of FIG. 1. The only difference in the embodiment of FIG. 3 however, is the track portion 111. FIG. 3 illustrates how the invention may be employed in a channel type track as opposed to the rail type track of FIGS. 1 and 2. The channel track 130 in which the modification of FIG. 3 may be employed has three portions, an upper portion, a central portion, and a lower portion. Accordingly, the track portion 111 of the gripper 110, includes an upper portion 150 a central portion 151 and a lower portion 152. These portions are designed to fit within the channel 130. However, roller bearings 155 are provided on each surface of the track portion 111 in contact with the channel 130. The purpose of these rollers is to offset moments tending to turn or reposition the gripper and to minimize friction between the track portion 111 and the track 130.

It is apparent that the modification of FIG. 3 may be employed also in the stretching station shown in FIG. 2. It is only necessary to replace the rail type track 30 with a channel type track 130.

Although there are specifically described above two embodiments which the present invention may assume in practice it will be understood that these forms are shown for purposes of illustration and that the invention may be modified and embodied in other forms or employed in other uses without departing from the spirit and scope of the invention, limited only by the appended claims.

We claim:

1. An apparatus for simultaneous biaxial orientation of a plastic film comprising a means for feeding and stretching a continuous web of sheet material longitudinally through a stretching station, two tracks positioned one on each side of said sheet material in said stretching station, said tracks diverging from the longitudinal axis of said sheet material in the direction of motion of said sheet material, and gripping means mounted on said tracks for gripping the edges of said sheet material and stretching said sheet material in a direction transverse to said direction of motion of said sheet material as said sheet material passes through said stretching station; said gripping means (a) being in abutting relationship at a first point along each of said tracks where said sheet material is gripped by said gripping means (b) being freely movable along said tracks while said sheet material is gripped between said first point and a second point along each of said tracks where said sheet material is released from said gripping means, and (c) being returned, after releasing said sheet material, to said first point and into said abutting relationship again; said gripping means having, (1) two parallel sides designed for abutting to form a continuous contacting group of said gripping means at said first point, (2) a film-holding portion, and (3) a track portion; said film-holding portion comprising a film contact surface and a pivotally mounted gripper lever biased by resilient means into engagement with said film contact surface; said film contact surface and said gripper lever being positioned inwardly from said two parallel sides to provide a recessed shoulder on either side of said film-holding portion, and said track portion comprising slot means and rolling means adapted to provide only rolling means contact with said tracks.

2. An apparatus as in claim 1, wherein said rolling means comprises a plurality of rollers rotatably mounted in said gripping means and wherein said tracks are rail type tracks; said rollers being arranged so that said rollers engage both sides and the top and bottom of said tracks when said rail passes through said slot means so that the only parts of said gripping means touching said tracks are said rollers.

3. An apparatus as in claim 1, wherein said tracks are interndal channel type tracks and said track portion of said gripping means comprises a plurality of extended portions adapted to engage the internal channels of said internal channel type tracks; said rolling means comprising a plurality of rollers rotatably mounted within said extended portions so that the only parts of said gripping means in contact with said tracks are said rollers.

4. An apparatus as in claim 1, wherein each of said tracks has a first parallel portion, a diverging portion, and a second parallel portion in that order along the direction of motion of said sheet material, and said apparatus has disengagement means positioned adjacent said first and second parallel portions of said tracks adapted for moving said gripper lever out of engagement with said film contact surface.

5. An apparatus as in claim 4, wherein said resilient means are springs.

References Cited

UNITED STATES PATENTS

| | | | |
|---|---|---|---|
| 3,123,854 | 3/1964 | Aykanian | 18—1 |
| 3,150,433 | 9/1964 | Kampf | 18—1 |
| 3,172,151 | 3/1965 | Glossmann | 18—1 |
| 3,175,245 | 3/1965 | Kreeft et al. | 18—1 |
| 3,247,544 | 4/1966 | Bromley | 18—1 |
| 3,256,558 | 6/1966 | Anderson et al. | 18—1 |

FOREIGN PATENTS

| | | |
|---|---|---|
| 1,339,215 | 8/1963 | France. |

WILLIAM J. STEPHENSON, *Primary Examiner.*